Figure 1:
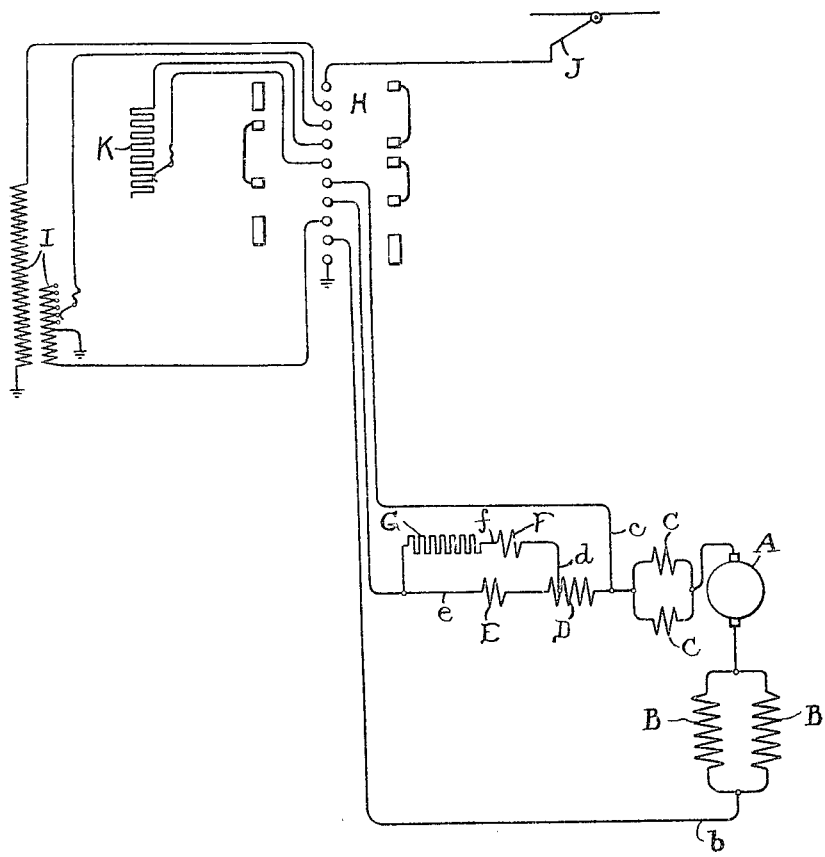

E. F. W. ALEXANDERSON.
COMMUTATOR MOTOR.
APPLICATION FILED JUNE 1, 1908.

949,992.

Patented Feb. 22, 1910.
2 SHEETS—SHEET 1.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

COMMUTATOR-MOTOR.

949,992.　　　　Specification of Letters Patent.　　Patented Feb. 22, 1910.

Application filed June 1, 1908. Serial No. 435,859.

*To all whom it may concern:*

Be it known that I, ERNST F. W. ALEXANDERSON, a citizen of the United States, residing at Schenectady, county of Schenectady, State of New York, have invented certain new and useful Improvements in Commutator-Motors, of which the following is a specification.

My invention relates to motors of the commutator type, and is particularly applicable to motors intended for operation on both direct and alternating current.

In a prior application, filed January 12, 1907, Ser. No. 351,957, I pointed out that a commutating field is more necessary in an alternating-current motor than in a direct-current motor, that an alternating-current motor should not have so strong a main field as a direct-current motor, and that by taking advantage of these two facts, it is possible to adapt a motor for most satisfactory operation on both direct and alternating-current by using a portion of the stator winding to produce a commutating field for alternating-current operation and to assist the main field winding for direct-current operation. In my former application, I disclosed a system of connections, for obtaining this double function of a portion of the stator coils, in which certain of the stator coils have their connections reversed with respect to the other stator coils in changing from direct to alternating-current, and vice versa.

My present invention, in one aspect, consists in a simplification of the connections and control of my former application.

In this aspect, my invention consists in connecting a portion of the stator winding in a local closed circuit so arranged that the currents induced therein in alternating-current operation produce a commutating field, and including this portion in the main motor circuit for direct-current operation so that the current flowing through it assists in producing the main field and excluding it for alternating-current operation. The connections in the local closed circuit may be made permanent, so that the only change in connections necessary in shifting from direct to alternating current, or vice versa, is to shift the connections from the source of current from one motor lead to another. Thus, the connections of the motor and control system are greatly simplified.

In another aspect, my invention consists of a novel arrangement of the stator windings, whereby the stator may be wound with uniform coils, and a portion of these coils may be so connected as to produce the desired commutating field.

My invention will best be understood by reference to the accompanying drawings, in which—

Figure 1 is a diagram of connections of a motor arranged in accordance with my invention, and Fig. 2 shows diagrammatically the construction and winding arrangement of the motor.

In Fig. 1, A represents the armature of a series-connected motor of the commutating type adapted for operation on both direct and alternating-current. The stator winding is divided into five groups of coils, B, C, D, E and F. The coils B act as the inducing or compensating winding for neutralizing armature reaction. I have indicated twelve of these coils connected in parallel groups of six coils each. C represents the coils which, on alternating-current, act as the exciting or magnetizing winding. I have indicated four of these coils connected in groups of two each. D represents another group of coils which, on direct-current operation, assist the coils C in producing the field magnetization of the motor. On alternating-current operation all but one of these four coils are out of circuit and idle. The left hand coil is, however, connected in a local closed circuit formed by one coil D and two coils E in parallel with two coils F and a resistance G. These coils form a local circuit so arranged, as will hereinafter be explained, that the current induced therein produces a suitable commutating field. For forming this local circuit, the motor is provided with three leads or connections $d$, $e$ and $f$. The lead $e$ is extended to the transfer switch H, which is thrown from one position to the other, in changing from direct to alternating-current operation. In addition to the lead $e$, the motor leads $b$ and $c$ are also carried to the transfer switch. For alternating-current operation, the leads $b$ and $c$ are connected to the source of current, so that the main motor circuit includes the armature A, compensating winding B and the exciting or magnetizing winding C, the local closed circuit formed by coils E, F and one coil D serving only to produce a commutating field. For direct-current operation, the leads $b$ and $e$ are connected to the supply circuit. This includes in the main motor circuit the coils of the local closed circuit. Coils E and D assist coils C in producing the field magnetization and, therefore, give a stronger field on direct-current operation. The resistance G is so high that comparatively little current passes through coils F on direct-current operation, but what little current flows therein assists in producing the field magnetization. This means that on alternating current operation current flowing in the local closed circuit through coils E and F in series produces opposing magneto-motive forces in these coils, so that if the fluxes of these two sets of coils were perfectly interlinked they could produce no commutating field. As will be shown, however, these two sets of coils are displaced from each other, the space created by the displacement between the sides of these coils being opposite the points at which commutation takes place in the rotor. At these points, therefore, when on alternating current operation current flows through these coils there are leakage fields which constitute the commutating fields desired. It is the one coil D, which is included in this motor-circuit, which forces through the coils E and F the current producing this commutating field. The resistance G serves to control the phase of the current, and, consequently, of the commutating field.

As I have already said, the switch H is a transfer switch, which is thrown from one position to the other in passing from direct to alternating-current. The switch is shown diagrammatically, and with its contacts developed on a plane surface. For alternating-current operation, the switch is thrown to move the left hand contacts into engagement with the contact fingers, which connects the leads $b$ and $e$ to the secondary of a transformer I of variable ratio, and connects the primary of this transformer to the source of current, as indicated by the connection of the transformer to the trolley or current collector J. For direct-current operation, the switch H is thrown to its other position, thereby connecting lead $b$ to ground and lead $e$ to trolley J through the resistance K.

The winding arrangement of the motor will best be understood by reference to Fig. 2. In this figure the coils and leads are lettered to correspond with Fig. 1. The stator of the motor is constructed like that of a standard induction motor, with its magnetic material uniformly distributed. A four pole motor is shown, with twenty-four stator slots. The armature A is wound with a fractional pitch winding, as is indicated by the span of the armature coils $a$ as compared with the stator coils, which are all of uniform and full pitch. The purpose of the fractional pitch armature winding is, as has been explained in prior applications of mine, to obtain similar distributions of stator and rotor magneto-motive forces for alternating-current operation and the resulting advantages of improved commutation and increased power-factor.

If the top slot in Fig. 2 be considered as slot No. 1, and the slots are counted in a clockwise direction, it will be seen that the compensating or inducing winding B fills twelve of the twenty-four slots, as follows: slots 24, 1, 2, 6, 7, 8, 12, 13, 14, 18, 19 and 20. In other words, it fills every other group of three slots each. Furthermore, it will be seen that the lines of magnetization of this winding make an angle of 45° with the horizontal. This is in line with the magneto-motive force of the rotor. To bring this out clearly, the commutator leads are so shown that the brushes $m$ are placed on the commutator M opposite the ends of the armature conductors with which at any instant they are in direct connection, as they would be in a Gramme-ring armature. The coils C, which form the exciting or magnetizing winding for alternating-current operation, occupy four slots which are the central slots of the groups of three slots each, unoccupied by the compensating winding B. It will be seen that the lines of magnetization of this winding are horizontal and vertical and, therefore, displaced ninety electrical degrees from the lines of magnetization of the compensating and rotor windings. In the slots on each side of the coil C are placed the coils D, E and F, which, in direct-current operation, are so connected as to assist the coil C in producing the magnetization of the motor. For alternating-current operation all but one of the coils D are out of circuit and idle. One of these coils is connected in series with the coils E and F in local closed circuit. This coil D, therefore, serves to drive through the coils E and F a current for producing the commutation field. The coils D are in inductive relation to the coils C, and the voltage induced in each coil D in alternating-current operation is consequently substantially in phase with the voltage across the terminals of the coils C,—that is, the terminals of the exciting winding. This winding being highly inductive, its terminal voltage is displaced nearly 90° from the line voltage or, in other words, the voltage at the motor terminals; and since the local closed circuit is made substantially non-inductive by the high resistance G, the current which flows through it, due to the voltage induced in coil D, is substantially in phase with that voltage and, therefore, approximately 90° out of phase with the voltage at the motor terminals. If the coils E and F were not displaced from each other, they could produce no commutating field;

but these coils are displaced from each other by two slots which lie opposite the points at which commutation is taking place in the rotor. Because of this displacement leakage fields are produced at these points, and these fields being in phase with the current in the local closed circuit which produces them are displaced approximately 90° from the phase of the voltage of the motor terminals. This, as is now well-understood in the art, is the proper phase for a commutating field for opposing the electromotive force induced by the transformer action of the exciting winding in the rotor coils short-circuited by the brushes in commutation. It will be seen that the pitch of the armature coils is less than unity by an amount corresponding approximately to the portion of the stator periphery occupied by the exciting or magnetizing coils C. The points where commutation takes place in the rotor are thus brought beneath the leakage fields produced by the relatively displaced coils E and F.

The coils in Fig. 2 are connected as is shown in Fig. 1, and arrow heads are employed to assist in tracing the circuits. For direct-current operation the current may be considered as entering at e. It then passes through the two coils E E in series, and one coil D, to the point d. A second circuit from the source to this point exists through resistance G (see Fig. 1) and through lead f and the two coils F. The current in coils F is small, but assists the current in coils E in producing their magnetization. From point d, the circuit continues through the three other coils D to a point in direct connection with lead c. At this point the circuit divides into parallel paths, each path including two coils C. The paths then join and the circuit passes through the lower commutator brush m, armature A, and out through upper brush m. The circuit then again divides into parallel paths, each path including six coils B in series. The two paths join at a point connected directly to the lead b. For alternating-current operation the current may be considered as entering at the lead c and passing through windings C, armature A, and winding B, and out at lead b. At the same time an induced current flows in the local closed circuit as has already been explained.

I do not desire to limit myself to the particular construction and arrangement of parts here shown, but aim in the appended claims to cover all modifications which are within the scope of my invention.

What I claim as new and desire to secure by Letters Patent of the United States, is,—

1. A motor of the commutator type, adapted for operation on both direct and alternating-current, having a portion of its stator winding connected to another portion of said winding and forming with said other portion and the connections between them a local closed circuit, and connections for including said portions in the main motor circuit for direct-current operation and excluding them therefrom for alternating-current operation.

2. A motor of the commutator type, adapted for operation on both direct and alternating-current, having a portion of its stator winding connected in a local closed circuit, phase-controlling means in said local circuit, and connections for including said portion in the main motor circuit for direct-current operation and excluding it therefrom for alternating current operation.

3. A motor of the commutator type, adapted for operation on both direct and alternating-current, having certain of its stator coils connected in parallel with other stator coils so as to form a local closed circuit, and connections for including said coils in the main motor circuit for direct-current operation and excluding them therefrom for alternating-current operation.

4. A motor of the commutator type, adapted for operation on both direct and alternating-current, having certain of its stator coils connected in parallel with other stator coils so as to form a local closed circuit, an impedance in series with one of the sets of coils which are in parallel with each other, and connections for including said coils in the main motor circuit for direct-current operation and excluding them therefrom for alternating-current operation.

5. A motor of the commutator type, adapted for operation on both direct and alternating current, having certain of its stator coils connected to other stator coils to form a local closed circuit, said coils having induced in them by the motor flux in alternating current operation a current approximately 90 degrees out of phase with the terminal voltage of the motor and being located to produce a commutating field opposite the points where commutation occurs in the rotor, and connections for including said coils in the main motor circuit for direct current operation only.

6. A motor of the commutator type, adapted for operation on both direct and alternating-current, having a set of its stator coils connected in parallel with a second set of stator coils displaced from the first set, the spaces created by the displacement between the sides of the coils of the two sets being opposite the points where commutation occurs in the rotor and the local circuit formed by said two sets of coils having induced in it by the motor flux in alternating-current operation a current approximately 90° out of phase with the terminal voltage of the motor, and connections for including said coils in the main motor circuit for operation on direct-current only.

7. A motor of the commutator type having a stator with its magnetic material uniformly distributed and wound with uniform coils, certain of said stator coils being connected to form a compensating winding, certain others of said coils being connected to form an exciting or magnetizing winding, certain other coils being connected to form a local closed circuit producing a commutating field by the current induced in said local circuit when the motor is operating on alternating current, and a rotor having coils of a fractional pitch less than unity by an amount corresponding to the portion of the stator periphery occupied by the coils forming the exciting or magnetizing winding.

8. A motor of the commutator type having certain of its stator coils connected to form a compensating winding, certain others of its stator coils connected to form an exciting or magnetizing winding, and certain others of its stator coils connected in parallel with a second set of stator coils displaced from the first set and forming therewith a local closed circuit, the spaces created by the displacement between the sides of the coils of the two sets being opposite the points where the commutation takes place in the rotor, and the local circuit formed by said two sets of coils having induced in it by the motor flux in alternating-current operation a current approximately 90° out of phase with the terminal voltage of the motor.

9. A motor of the commutator type having a rotor wound with coils of a fractional pitch, and having a stator with its magnetic material uniformly distributed and wound with uniform coils, a portion of said stator coils being connected to form an inducing or compensating winding, another portion to form an exciting or magnetizing winding, and another portion comprising coils the sides of which lie adjacent to the points where commutation takes place in the rotor and which are connected in a local closed circuit adapted to produce a commutating field by the current induced in said local circuit when the motor is operated on alternating-current.

10. A motor of the commutator type having a rotor wound with coils of a fractional pitch, and having a stator with its magnetic material uniformly distributed and wound with uniform coils, a portion of said stator coils being connected to form an inducing or compensating winding, another portion to form an exciting or magnetizing winding, and another portion comprising two sets of coils connected in parallel with each other so as to form a local closed circuit, said two sets being somewhat displaced from each other, the spaces created by the displacement between the sides of the coils of the two sets being opposite the points where commutation occurs in the rotor.

11. A motor of the commutator type having a rotor wound with coils of a fractional pitch, and having a stator with its magnetic material uniformly distributed and wound with uniform coils, a portion of said stator coils being connected to form an inducing or compensating winding, another portion to form an exciting or magnetizing winding, and another portion comprising two sets of coils connected in parallel with each other so as to form a local closed circuit, said two sets being somewhat displaced from each other, the spaces created by the displacement between the sides of the coils of the two sets being opposite the points where commutation occurs in the rotor, and phase controlling means included in said local closed circuit.

In testimony whereof, I have hereunto set my hand this 29th day of May, 1908.

ERNST F. W. ALEXANDERSON.

Witnesses:
BENJAMIN B. HULL,
HELEN ORFORD.